(12) United States Patent
Terazawa

(10) Patent No.: US 10,705,289 B2
(45) Date of Patent: Jul. 7, 2020

(54) LIGHTING DEVICE AND DISPLAY DEVICE

(71) Applicant: Sharp Kabushiki Kaisha, Sakai, Osaka (JP)

(72) Inventor: Hidetaka Terazawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/433,008

(22) Filed: Jun. 6, 2019

(65) Prior Publication Data
US 2019/0383995 A1 Dec. 19, 2019

Related U.S. Application Data

(60) Provisional application No. 62/684,767, filed on Jun. 14, 2018.

(51) Int. Cl.
*G02B 6/10* (2006.01)
*F21V 8/00* (2006.01)

(52) U.S. Cl.
CPC ......... *G02B 6/0088* (2013.01); *G02B 6/0055* (2013.01)

(58) Field of Classification Search
CPC ... G02B 6/0045; G02B 6/0055; G02B 6/0088
See application file for complete search history.

(56) References Cited

U.S. PATENT DOCUMENTS

| | | | | |
|---|---|---|---|---|
| 4,630,895 A * | 12/1986 | Abdala, Jr. | ............ | G02B 6/002 349/62 |
| 5,664,862 A * | 9/1997 | Redmond | ............. | G02B 6/001 362/293 |
| 5,841,596 A * | 11/1998 | Perlo | .................... | G02B 5/1876 359/859 |
| 6,547,408 B1 * | 4/2003 | Greiner | ............... | G02B 6/0036 362/23.15 |
| 6,663,262 B2 * | 12/2003 | Boyd | ................... | G02B 6/0031 362/19 |
| 6,874,926 B2 * | 4/2005 | Nousiainen | ........ | G02B 6/0018 362/23.03 |
| 7,178,942 B2 * | 2/2007 | Chen | .................... | G02B 6/0028 362/231 |
| 7,399,108 B2 * | 7/2008 | Ayabe | ................. | G02B 6/0001 257/E33.071 |

(Continued)

FOREIGN PATENT DOCUMENTS

JP    2013-149559 A    8/2013

*Primary Examiner* — Julie A Bannan
(74) *Attorney, Agent, or Firm* — Keating & Bennett, LLP

(57) ABSTRACT

A lighting device includes a light-guiding plate and a light source. The light-guiding plate includes a light entrance surface, an entrance opposite surface located opposite to the light entrance surface, a light exit surface, and an exit opposite surface located opposite to the light exit surface. The light-guiding plate has a notch formed by notching a part thereof. A region between the notch and the entrance opposite surface is a shielded region where the notch blocks light guided through inside the light-guiding plate from the light entrance surface toward the entrance opposite surface, and a condensing member having a reflecting surface that reflects, in a condensing manner toward the shielded region, light having leaked out through the exit opposite surface is provided opposite the exit opposite surface of the light-guiding plate.

7 Claims, 6 Drawing Sheets

(56) References Cited

U.S. PATENT DOCUMENTS

| | | | | |
|---|---|---|---|---|
| 7,942,546 B2* | 5/2011 | Naijo | G02B 6/0018 362/231 |
| 8,702,295 B2* | 4/2014 | Lin | G02B 6/0083 362/612 |
| 9,268,082 B2* | 2/2016 | Van Dijk | G02B 6/0036 |
| 9,835,787 B2* | 12/2017 | Lee | G02B 6/002 |
| 9,857,519 B2* | 1/2018 | Shani | G02B 6/0031 |
| 10,267,976 B1* | 4/2019 | Zheng | G02B 6/0045 |
| 2006/0083028 A1* | 4/2006 | Sun | G02B 6/0016 362/615 |
| 2009/0129119 A1* | 5/2009 | Lee | B29C 33/3842 362/619 |
| 2009/0303744 A1* | 12/2009 | Iwasaki | G02B 6/0041 362/612 |
| 2010/0118065 A1* | 5/2010 | Song | G02B 6/0038 345/697 |
| 2012/0050649 A1* | 3/2012 | Yeo | G02B 6/002 349/65 |
| 2012/0147591 A1* | 6/2012 | Okada | F21V 5/00 362/84 |
| 2013/0301295 A1* | 11/2013 | Iwasaki | F21V 7/00 362/609 |
| 2015/0003094 A1* | 1/2015 | Gebauer | F21S 41/24 362/511 |
| 2015/0023056 A1* | 1/2015 | Fang | G02B 6/002 362/609 |
| 2015/0116627 A1* | 4/2015 | Yu | G02F 1/133308 349/58 |
| 2016/0282548 A1* | 9/2016 | He | G02B 6/0065 |
| 2016/0363714 A1* | 12/2016 | Zhou | G02B 6/0055 |
| 2017/0036598 A1* | 2/2017 | Bombard | B60K 35/00 |
| 2017/0052309 A1* | 2/2017 | Chen | G02B 6/0058 |
| 2017/0059771 A1* | 3/2017 | Yuki | G02F 1/133615 |
| 2017/0082789 A1* | 3/2017 | Yasunaga | G02F 1/1336 |
| 2017/0276316 A1* | 9/2017 | Kawabata | F21S 43/243 |
| 2017/0336553 A1* | 11/2017 | Yuki | G02B 6/0031 |
| 2018/0087748 A1* | 3/2018 | Gladden | G02B 6/0055 |
| 2019/0072822 A1* | 3/2019 | Yasunaga | G02B 6/0055 |
| 2019/0219756 A1* | 7/2019 | Kawano | G02F 1/1333 |
| 2019/0227218 A1* | 7/2019 | Kawano | G02B 6/0051 |
| 2019/0302342 A1* | 10/2019 | Kohsaka | G02B 6/0055 |

* cited by examiner

LIGHTING DEVICE AND DISPLAY DEVICE

CROSS REFERENCE TO RELATED APPLICATION

This application claims priority from U.S. Provisional Application No. 62/684,767 filed on Jun. 14, 2018. The entire contents of the priority application are incorporated herein by reference.

TECHNICAL FIELD

A technology disclosed herein relates to a lighting device and a display device each having a notch such as a hole or a recess in a light-guiding plate.

BACKGROUND

In recent years, liquid crystal display devices each including a liquid crystal panel have been used as display devices of instruments and the like provided in electronic apparatuses such as information terminals and vehicles such as automobiles. Since a liquid crystal panel does not emit light by itself, it needs to use extraneous light to display an image. For that purpose, this type of display device includes, in addition to a liquid crystal panel, a lighting device (i.e. a backlight device) for supplying the liquid crystal panel with light. This backlight device is disposed behind the liquid crystal panel, and is configured to illuminate the back surface of the liquid crystal panel with planarly-spread light.

A known example of a backlight device is an edge-lighting (or side-lighting) backlight device, such as that disclosed in Patent Literature 1, that includes a light-guiding plate constituted of a transparent plate-shaped member and a light source (e.g. an LED) placed in such a manner as to face an end face of this light-guiding plate. Light emitted by the light source of the backlight device enters the light-guiding plate through an end face (hereinafter referred to as "light entrance surface") of the light-guiding plate that faces the light source. Moreover, the light propagates through inside the light-guiding plate and, at the same time, exits as planar light through a front-side plate surface (hereinafter referred to as "light exit surface").

RELATED ART DOCUMENT

[Patent Literature 1] Japanese Unexamined Patent Application Publication No. 2013-149559

However, in an edge-lighting backlight device, such as that disclosed in Patent Literature 1, configured such that a light-guiding plate is provided with a notched portion (i.e. a notch) such as a hole or a recess, lighting having entered the light-guiding plate through the light entrance surface and traveling in a straight line toward an entrance opposite surface located on a side opposite to the light entrance surface has its path blocked by the notch and suffers from unevenness in luminance due to a decrease in luminance of a region located closer to the entrance opposite surface than the notch.

A conceivable solution to such unevenness in luminance is a configuration in which a light source is provided on the side of the entrance opposite surface; however, such a configuration leads to increased complication of a configuration for light source placement, and by extension to increases in size and cost of the backlight device.

SUMMARY

The technology disclosed herein is one completed in view of circumstances such as those described above and has as an object to provide a lighting device and a display device with a reduction in unevenness in luminance even in a case where a light-guiding plate is provided with a notch.

A technology disclosed herein is directed to a lighting device including: a light-guiding plate constituted of a plate-shaped member; and a light source that is disposed opposite an end face of the light-guiding plate and emits light toward the end face, and the light-guiding plate includes a light entrance surface through which light from the light source enters, an entrance opposite surface located opposite to the light entrance surface, a light exit surface that is one of a pair of plate surfaces and through which the light exits, and an exit opposite surface located opposite to the light exit surface, and has the light-guiding plate has a notch formed by notching a part thereof, a region between the notch and the entrance opposite surface is a shielded region where the notch blocks light guided through inside the light-guiding plate from the light entrance surface toward the entrance opposite surface, and a condensing member having a reflecting surface that reflects, in a condensing manner toward the shielded region, light having leaked out through the exit opposite surface is provided opposite the exit opposite surface of the light-guiding plate.

With such a configuration, even if light that enters through the light entrance surface of the light-guiding plate and is guided through inside the light-guiding plate has its path blocked by the notch, the light having leaked out through the exit opposite surface is reflected by the reflecting surface of the condensing member and allowed reentry while being condensed toward the shielded region. Accordingly, the light thus allowed reentry illuminates the shielded region, so that a reduction in unevenness in luminance is achieved.

The technology disclosed herein gives a lighting device and a display device with a reduction in unevenness in luminance even in a case where a light-guiding plate is provided with a notch such as a hole or a recess.

DETAILED DESCRIPTION

Embodiment 1

Embodiment 1 will be described with reference to FIGS. 1 to 4. The present embodiment illustrates a liquid crystal display device 10 (which is an example of a display device) including a liquid crystal panel 11 (which is an example of a display panel) that is capable of displaying an image and a backlight device 20 (which is an example of a lighting device) that supplies the liquid crystal panel 11 with light for display. It should be noted that some of the drawings show an X axis, a Y axis, and a Z axis and are drawn so that the direction of each axis is a direction shown in each drawing.

Figure 4:
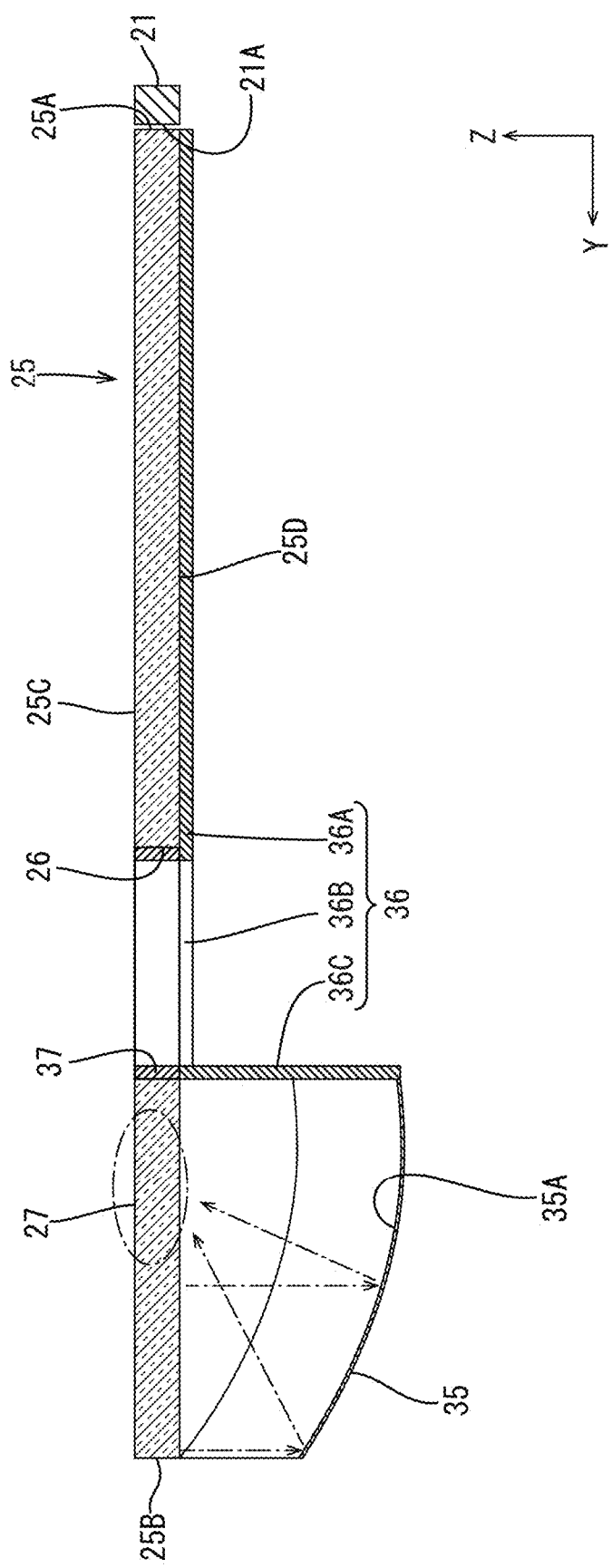
FIG. 4 is a sectional side view of the main components of the backlight device.

FIG. 4 serves as a basis for a vertical direction and shows the front side up and the back side down. Further, the X-axis direction, the Y-axis direction, and the Z-axis direction serve as a width direction or a lateral direction, a length direction, and a thickness direction, respectively.

The liquid crystal display device 10 of the present embodiment has a substantially block shape that is rectangular in a plan view as a whole, and the liquid crystal panel 11 and the backlight device 20, which is disposed behind the liquid crystal panel 11, are held together by a frame-shaped bezel. The liquid crystal display device 10 of the present embodiment is for example assembled into the dashboard of an automobile for use, constitutes a part of the instrument panel, and is enabled to display some of the instruments of the instrument panel, various types of warning image, map images of a car navigation system, images taken by an on-board camera, and the like.

The liquid crystal panel 11 takes the form of a rectangular plate and, although not illustrated in detail, is of a well-known configuration in which a pair of transparent (highly translucent) glass substrates are bonded together with a predetermined gap therebetween and liquid crystals are disposed between the two glass substrates. One of the glass substrates is provided with switching elements (e.g. TFTs) connected to source lines and gate lines that are orthogonal to each other, pixel electrodes connected to the switching elements, an alignment film, and the like, and the other of the glass substrates is provided with a color filter having colored portions such as R (red) portions, G (green) portions, and B (blue) portions arranged in a predetermined array, a counter electrode, an alignment film, and the like. Among these, the source lines, the gate lines, the counter electrode, and the like are supplied with image data and various types of control signal from a drive circuit board that are needed to display an image. Further, polarizing plates are disposed on the outer sides of the two glass substrates, respectively.

The liquid crystal panel 11 can display an image through the use of light supplied from the backlight device 20, and has its front side serving as a light exit side. It should be noted that the liquid crystal panel 11 has its long side direction corresponding to the Y-axis direction, its short side direction corresponding to the X-axis direction, and its thickness direction corresponding to the Z-axis direction.

The liquid crystal panel 11 of the present embodiment has a panel through-hole 12 (which is an example of a panel notch) bored therethrough. This panel through-hole 12 communicates with the after-mentioned device through-hole 32 of the backlight device 20 and allows passage of objects such as needles of mechanical instruments of the instrument panel that are disposed behind the liquid crystal display device 10. The panel through-hole 12 has its hole edge sealed by a sealing member so that the liquid crystals do not leak out.

As with the liquid crystal panel 11, the backlight device 20 has a substantially block shape that is rectangular in a plan view as a whole. The backlight device 20 includes at least a plurality of LEDs 21 (light-emitting diodes) serving as light sources, an LED board mounted with the LEDs 21, a light-guiding plate 25 that guides light emitted by the LEDs 21, a plurality of optical sheets 30 stacked in front of the light-guiding plate 25, a reflecting sheet 35 disposed behind the light-guiding plate 25, and a light-absorbing sheet 36 disposed behind the light-guiding plate 25, and these components are accommodated in a substantially box-shaped chassis having an opening facing toward the liquid crystal panel 11 disposed in front thereof.

The backlight device 20 is a one-side light entrance edge-lighting (side-lighting) backlight device in which the LEDs 21 are placed at one short-side end face of the light-guiding plate 25 so that light enters the light-guiding plate 25 only through one side. The backlight device 20 converts light from the LEDs 21 into planar light and, at the same time, emits the planar light forward to the liquid crystal panel 11 through the opening site of the chassis. That is, the backlight device 20 has its front side serving as a light exit side. The following describes the components of the backlight device 20 in sequence.

Each of the LEDs 21 is configured such that an LED chip (LED element) that is a semiconductor light-emitting element is sealed by a resin material on a base member firmly fixed to a plate surface of the after-mentioned LED board. The LED chip that is mounted on the base member has one type of dominant emission wavelength, and specifically, one that monochromatically emits blue light is used. Meanwhile, the resin material that seals the LED chip is dispersedly blended with a phosphor that emits a predetermined color of light by being excited by blue light emitted by the LED chip and emits substantially white light as a whole. This LED 21 has its light-emitting surface 21a adjacent to a surface (mounted surface) thereof mounted on the LED board. As such, the LED 21 is a so-called side-emitting light-emitting diode.

Figure 3:
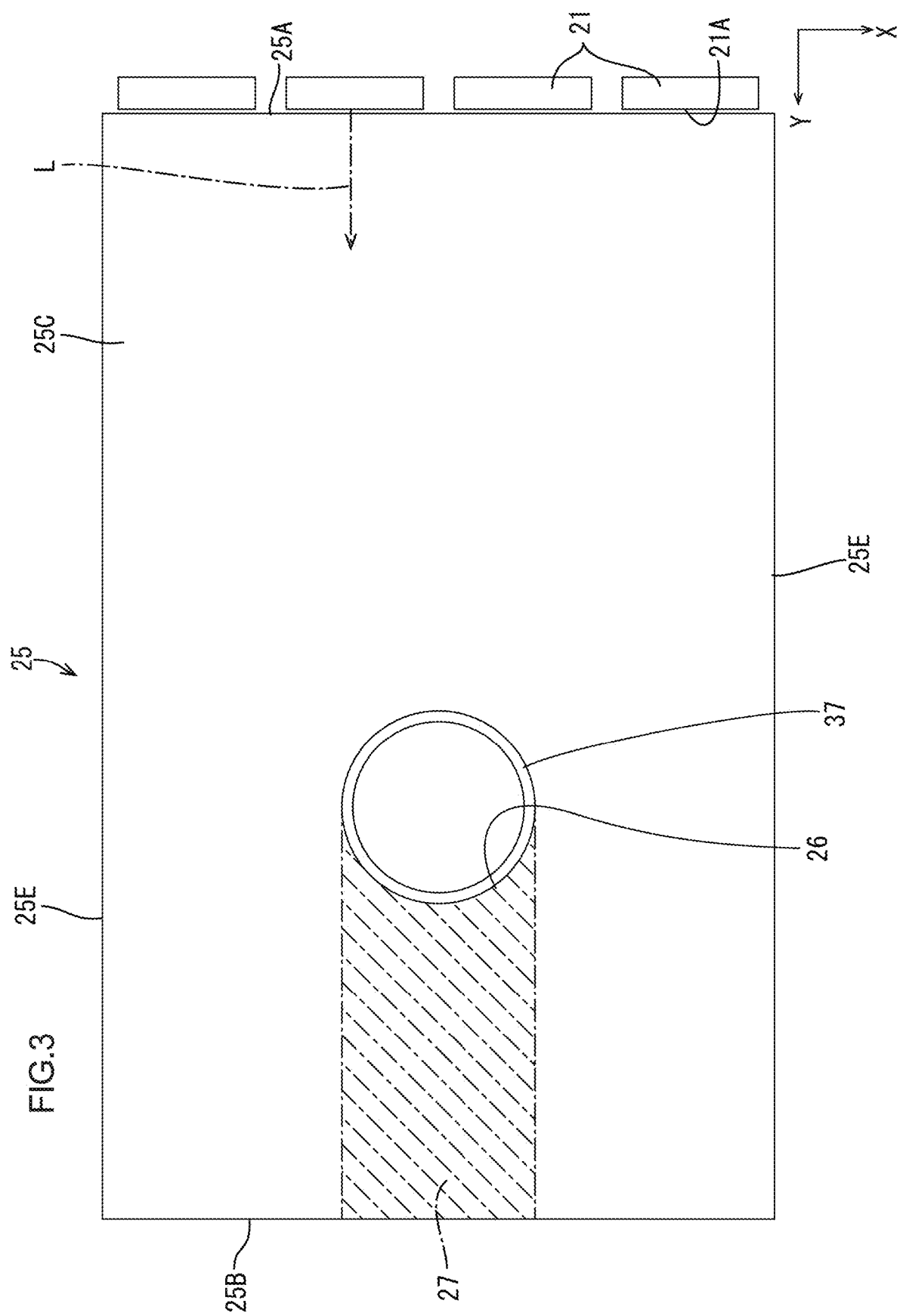
FIG. 3 is a plan view of the main components of the backlight device.

Each of the LEDs 21 emits, through its light-emitting surface 21a, light having a predetermined spread (directivity) centered at an optical axis L (see FIG. 3). In the case of the present embodiment, the optical axis L of the light thus emitted is in a state of being substantially perpendicular to a central portion of the light-emitting surface 21a and corresponds to the Y-axis direction. For this reason, more of a portion of the light from the LED 21 that travels toward end faces (an entrance opposite surface 25B and a pair of side surfaces 25E) of the after-mentioned light-guiding plate 25 other than a light entrance surface 25A reaches the entrance opposite surface 25B than the pair of side surfaces 25E.

The LED board is configured such that the plurality of LEDs 21 are surface-mounted in such a manner as to be intermittently arranged on a flexible film-shaped (sheet-shaped) base material made of an insulating material and a wiring pattern for feeding electricity to the LEDs 21 is patterned. The LED board is disposed such that the light-emitting surfaces 21a of the LEDs 21 mounted thereon face in parallel with the light entrance surface 25A of the light-guiding plate 25.

Next, the light-guiding plate 25 will be described. The light-guiding plate 25 is made of a transparent synthetic resin such as acrylic resin or polycarbonate as a whole and, as shown in FIGS. 1 to 4, has a rectangular plate shape. The light-guiding plate 25 has its long side direction corresponding to the Y-axis direction, its short side direction corresponding to the X-axis direction, and its thickness direction corresponding to the Z-axis direction.

Of the outer peripheral end faces of the light-guiding plate 25, the right short-side end face shown in FIGS. 3 and 4 serves as the light entrance surface 25A that faces the light-emitting surfaces 21a of the LEDs 21 and through which light from the LEDs 21 enters. Further, in the present embodiment, the end face (the left end face of FIGS. 3 and 4) located on a side opposite to the light entrance surface 25A is referred to as the entrance opposite surface 25B, and of the pair of plate surfaces, the upper surface (front surface) is referred to as a light exit surface 25C through which light exits toward the liquid crystal panel 11 and the lower surface (back surface) is referred to as an exit opposite surface 25D. Furthermore, of the outer peripheral end faces of the light-guiding plate 25, the long-side end faces (end faces other than the light entrance surface 25A and the entrance opposite surface 25B) are referred to as the pair of side surfaces 25E.

The light-guiding plate 25 is located directly below the liquid crystal panel 11 with the optical sheets 30 interposed therebetween and, in a state where the liquid crystal panel 11 and the light-guiding plate 25 are assembled in a normal position, has a light-guiding plate through-hole 26 (which is an example of a notch) provided in a position that corresponds to the aforementioned panel through-hole 12. Specifically, as shown in FIG. 3, the light-guiding plate through-hole 26 is provided in the midsection between the pair of side surfaces 25E in a width direction of the light-guiding plate 25 and at one end slightly eccentrically located closer to the entrance opposite surface 25B than the midsection between the light entrance surface 25A and the entrance opposite surface 25B in a length direction of the light-guiding plate 25.

Figure 1:
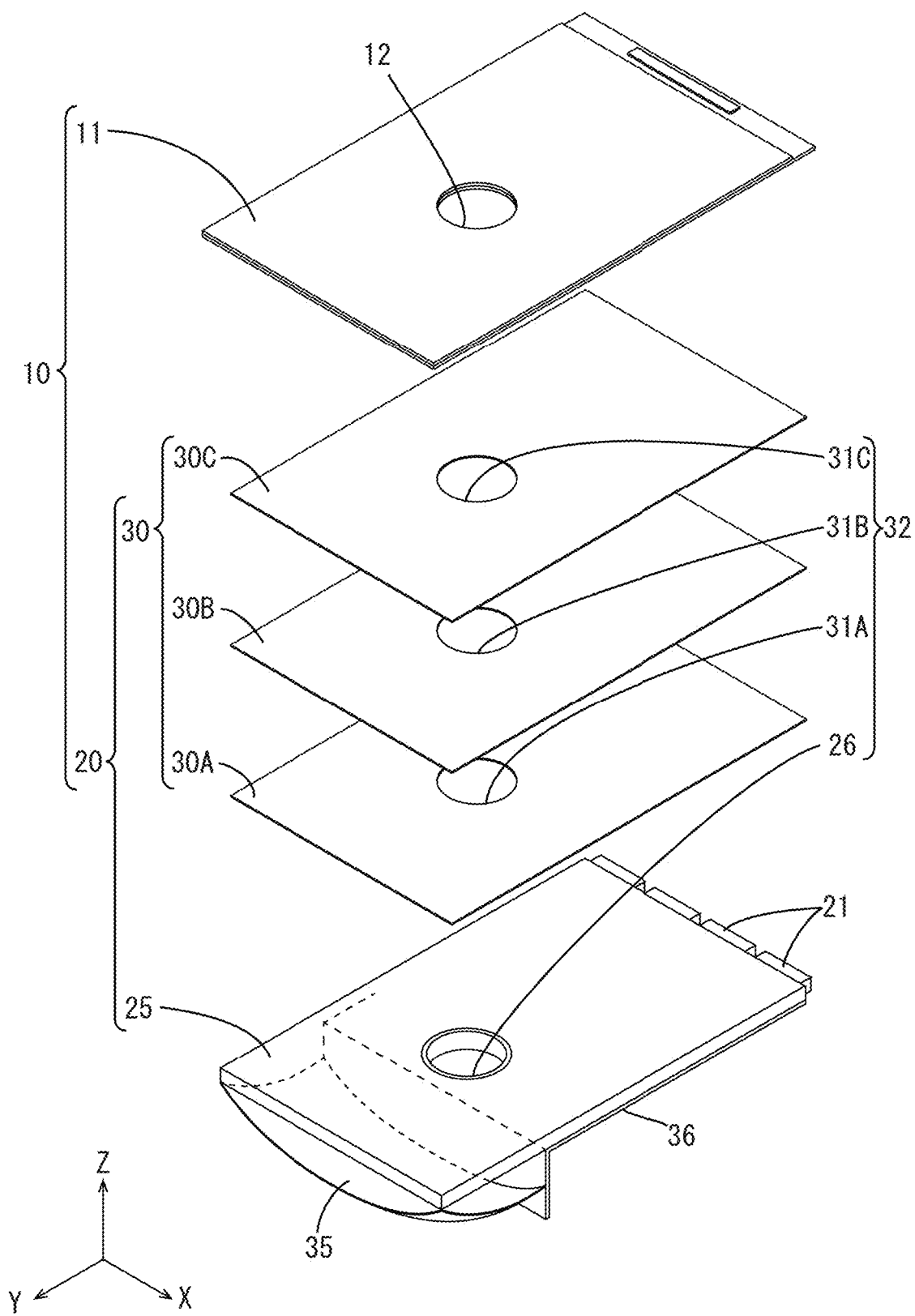
FIG. 1 is an exploded perspective view of the main components of a liquid crystal display device of Embodiment 1.

As shown in FIG. 1, the three optical sheets 30 are stacked on the light exit surface 25C of the light-guiding plate 25. Each of the optical sheets 30 takes the form of a flat rectangular sheet and has its long side direction corresponding to the Y-axis direction and its short side direction corresponding to the X-axis direction. By being disposed to be interposed between the light-guiding plate 25 and the liquid crystal panel 11, the optical sheets 30 transmit light emitted from the light-guiding plate 25 and, while imparting a predetermined optical effect to the light thus transmitted, causes the light to exit toward the liquid crystal panel 11.

The optical sheets 30 according to the present embodiment consist of a diffusion sheet 30A, a lens sheet 30B, and a reflective polarizing sheet 30C that are stacked in this order from underneath. Among these, the diffusion sheet 30A is configured to be dispersedly blended with a large number of diffusing particles for diffusion of light in a substantially transparent base material made of synthetic resin. The diffusion sheet 30A is stacked directly above the light-guiding plate 25 and located closest to the light-guiding plate 25 of the optical sheets 30. These sheets 30A, 30B, and 30C have sheet through-holes 31A, 31B, and 31C provided in positions thereof that correspond to the light-guiding plate through-hole 26. A through-hole that is formed by the sheet through-holes 31A, 31B, and 31C, the light-guiding plate through-hole 26, and the after-mentioned sheet through-hole 36B of the light-absorbing sheet 36 is hereinafter referred to as a device through-hole 32.

Incidentally, in the edge-lighting backlight device 20 configured such that, as mentioned above, the light-guiding plate 25 is provided with the light-guiding plate through-hole 26 bored through the plate surfaces, a portion of the light having entered the light-guiding plate 25 through the light entrance surface 25A with directivity has its path blocked by an object inserted in the light-guiding plate through-hole 26 or by the light-guiding plate through-hole 26 per se. For this reason, a region of the light-guiding plate 25 that is closer to the entrance opposite surface 25B than the light-guiding plate through-hole 26, i.e. a region between the light-guiding plate through-hole 26 and the entrance opposite surface 25B, is a shielded region 27 that is hard for light to reach (see FIG. 3). This shielded region 27 causes unevenness in luminance of the backlight device 20.

To address such a problem, the backlight device 20 of the present embodiment includes a reflecting sheet 35 (which is an example of a condensing member) that reflects light having propagated through inside the light-guiding plate 25 and leaked out through the exit opposite surface 25D and condenses the light toward the shielded region 27.

Although the light-guiding plate 25 usually has a concavo-convex pattern provided on the exit opposite surface 25D so that light emitted by the LEDs 21 and having entered the light-guiding plate 25 uniformly exits through the light exit surface 25C, a portion of the light having propagated through inside the light-guiding plate 25 leaks out through the exit opposite surface 25D. The reflecting sheet 35 of the present embodiment serves to reflect this leaked light toward the shielded region 27 for reentry while condensing it.

The reflecting sheet 35 is described in detail. The reflecting sheet 35 is placed opposite a region of the exit opposite surface 25D of the light-guiding plate 25 that is closer to the entrance opposite surface 25B in the optical axial direction of light (Y-axis direction, length direction of the light-guiding plate 25) than a hole edge of the light-guiding plate through-hole 26, and extends across the whole region in a width direction (X-axis direction). In other words, the reflecting sheet 35 has a reflecting surface 35A that, in a case where the light-guiding plate 25 is seen in a plan view, is disposed to overlap a region of the light-guiding plate 25 that is located closer to the entrance opposite surface 25B than the light-guiding plate through-hole 26.

Figure 2:
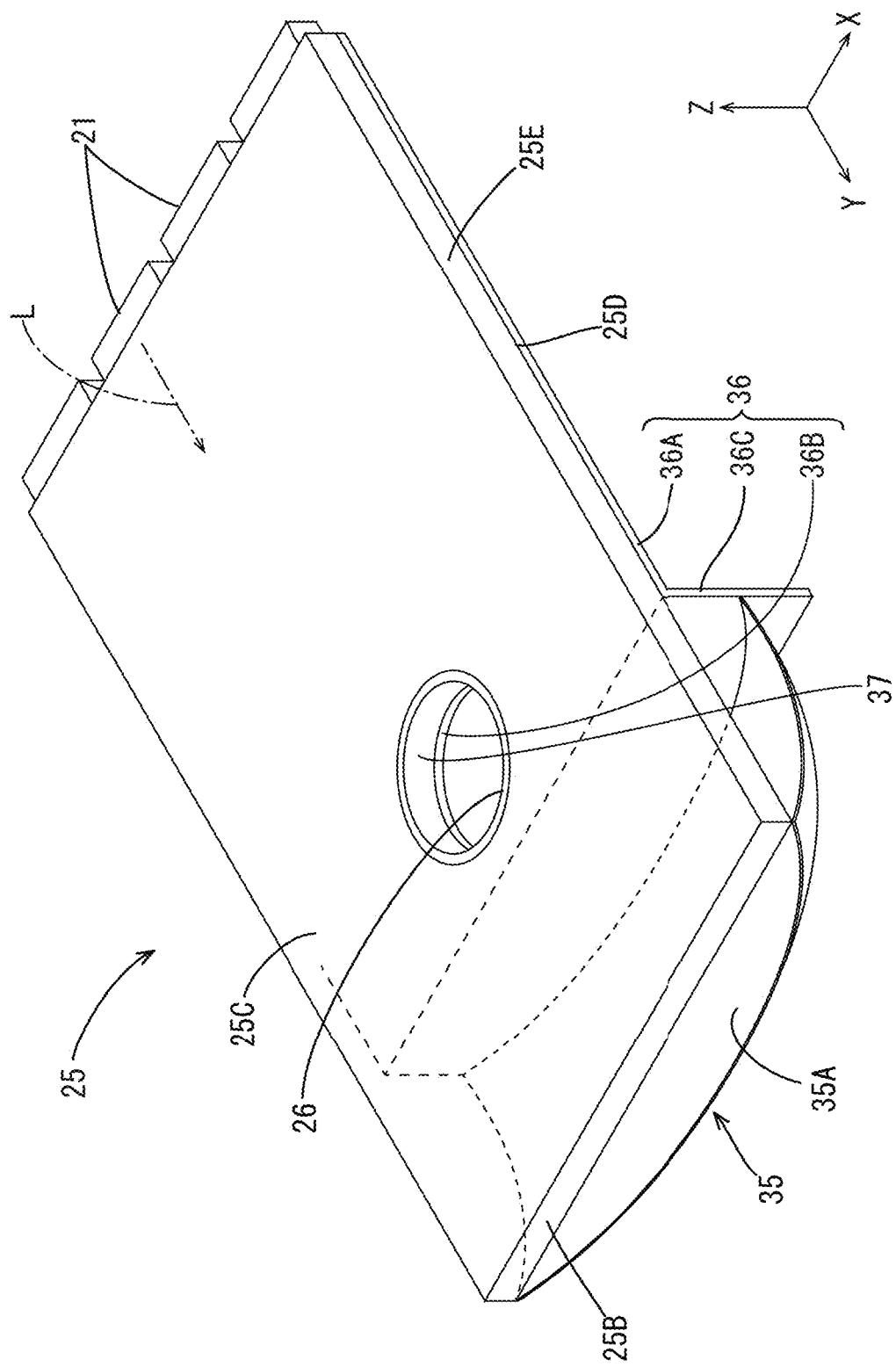
FIG. 2 is a perspective view of the main components of a backlight device.

Further, as shown in FIG. 2, the reflecting sheet 35 is disposed to be in the shape of a paraboloid (which an example of the shape of a curved surface) centered at the shielded region 27 and depressed in a concave manner in a direction away from the exit opposite surface 25D of the light-guiding plate 25. As a result, the reflecting surface 35A of the reflecting sheet 35 is disposed to surround the shielded region 27 in the shape of a dome from a position away from the shielded region 27 in a width direction.

Furthermore, as shown in FIGS. 2 and 4, the reflecting sheet 35 is disposed in the optical axial direction of light to be in the shape of a curved line that edges away from the exit opposite surface 25D of the light-guiding plate 25 from the entrance opposite surface 25B to a hole edge of the light-guiding plate through-hole 26 that faces the entrance opposite surface 25B.

The shape in which the reflecting sheet 35 is disposed to be is optically set so that light reflected by the reflecting surface 35A is condensed toward the shielded region 27. That is, with such a configuration, that portion of light emitted by the LEDs 21, having entered the light-guiding plate 25, and having propagated through inside the light-guiding plate 25 which have leaked out through the exit opposite surface 25D located closer to the entrance opposite surface 25B than the light-guiding plate through-hole 26 is reflected by the reflecting surface 35A of the reflecting sheet 35, condensed toward the shielded region 27, and allowed reentry through the exit opposite surface 25D of the shielded region 27 of the light-guiding plate 25. Accordingly, this light thus allowed reentry illuminates the shielded region 27, so that uniformity in the whole luminance of the light-guiding plate 25 is achieved.

It should be noted that the reflecting sheet 35 has at least its reflecting surface 35A made of a synthetic resin material that is superior in light reflectivity, and can efficiently reflect, toward the light-guiding plate 25, light having propagated through inside the light-guiding plate 25 and leaked out through the exit opposite surface 25D.

The light-absorbing sheet 36 is stacked on a region of the exit opposite surface 25D of the light-guiding plate 25 that extends from the hole edge of the light-guiding plate through-hole 26 that faces the entrance opposite surface 25B to the light entrance surface 25A in the optical axial direction (Y-axis direction), and extends across the whole region in a width direction (X-axis direction). In other words, the light-absorbing sheet 36 is stacked on a region of the exit opposite surface 25D where the reflecting sheet 35 is not placed opposite. A region of the light-absorbing sheet 36 stacked on the exit opposite surface 25D is hereinafter referred to as a stacked part 36A. Further, this stacked part 36A is provided with a through-hole, bored through a sheet surface, that corresponds to the light-guiding plate through-hole 26, and this through-hole is referred to as a sheet through-hole 36B.

As shown in FIGS. 2 and 4, this light-absorbing sheet 36 bends in the shape of letter L downward at an edge thereof that faces the entrance opposite surface 25B, extends at least to a lower end of the reflecting sheet 35, and is in contact with an edge of the reflecting sheet 35 that faces the light entrance surface 25A. A region of the light-absorbing sheet 36 that bends and extends from the stacked part 36A is referred to as a rising part 36C. That is, the light-absorbing sheet 36 is composed of the stacked part 36A, which has the sheet through-hole 36B, and the rising part 36C.

Furthermore, the light-guiding plate through-hole 26 has its hole wall covered with a light-absorbing tape 37.

The light-absorbing sheet 36 and the light-absorbing tape 37 have at least their surfaces made of a black synthetic resin material, and have the function of absorbing light having propagated through inside the light-guiding plate 25 and leaked out through the exit opposite surface 25D and the hole wall of the light-guiding plate through-hole 26.

It should be noted that the light-guiding plate through-hole 26 may be configured to have its hole wall provided with a light-absorbing material or a light-absorbing film instead of the light-absorbing tape 37.

The LED board, the light-guiding plate 25, the reflecting sheet 35, and the like are accommodated, for example, in the substantially box-shaped chassis or the like and held together with the liquid crystal panel 11 by the frame-shaped bezel to constitute the liquid crystal display device 10.

The liquid crystal display device 10 of the present embodiment is configured as described above, and its working effects are described next.

A backlight device 20 of the present embodiment includes a light-guiding plate 25 constituted of a plate-shaped member and an LED 21, placed opposite an end face of the light-guiding plate 25, that emits light toward the end face. The light-guiding plate 25 includes a light entrance surface 25A through which light from the LED 21 enters, an entrance opposite surface 25B located opposite to the light entrance surface 25A, a light exit surface 25C that is one of a pair of plate surfaces and through which the light exits, and an exit opposite surface 25D located opposite to the light exit surface 25C and has a light-guiding plate through-hole 26. A region between the light-guiding plate through-hole 26 and the entrance opposite surface 25B is a shielded region 27 where the light-guiding plate through-hole 26 blocks light guided through inside the light-guiding plate 25 from the light entrance surface 25A toward the entrance opposite surface 25B. A reflecting sheet 35 having a reflecting surface 35A that reflects, in a condensing manner toward the shielded region 27, light having leaked out through the exit opposite surface 25D is provided opposite the exit opposite surface 25D of the light-guiding plate 25.

With such a configuration, even if light that enters through the light entrance surface 25A of the light-guiding plate 25 and is guided through inside the light-guiding plate 25 has its path blocked by the light-guiding plate through-hole 26, the light having leaked out through the exit opposite surface 25D is reflected by the reflecting surface 35A of the reflecting sheet 35 and allowed reentry while being condensed toward the shielded region 27. Accordingly, the light thus allowed reentry illuminates the shielded region 27, so that a reduction in unevenness in luminance is achieved.

Further, the reflecting sheet 35 is disposed so that in a case where the light-guiding plate 25 is seen in a plan view, its reflecting surface 35A overlaps a region of the light-guiding plate 25 that is located closer to the entrance opposite surface 25B than the light-guiding plate through-hole 26.

Further, the reflecting surface 35A is in the shape of a curved surface depressed in a direction away from the light-guiding plate 25 so as to surround the shielded region 27.

Such a configuration makes it possible to achieve a configuration in which the light having leaked out through the exit opposite surface 25D is reflected and allowed reentry while being efficiently condensed toward the shielded region 27.

Further, a light-absorbing sheet 36 that absorbs the light having leaked out through the exit opposite surface 25D is provided in a region of the exit opposite surface 25D that the reflecting surface 35A does not face. With such a configuration, the luminance of a region of the light-guiding plate 25 that is comparatively high in luminance is reduced, so that unevenness in luminance of the light-guiding plate 25 as a whole can be reduced.

Further, a liquid crystal display device 10 of the present embodiment includes a liquid crystal panel 11 and the aforementioned backlight device 20, and the liquid crystal panel 11 has a panel through-hole 12 bored through a plate surface in correspondence with the light-guiding plate through-hole 26 and provided in a position that corresponds to the light-guiding plate through-hole 26.

Such a liquid crystal display device 10 and a backlight device 20 of the present embodiment make it possible to reduce unevenness in luminance even in a case where the liquid crystal panel 11 and the light-guiding plate 25 are provided with the through-holes 12 and 26, respectively.

Embodiment 2

Figure 5:
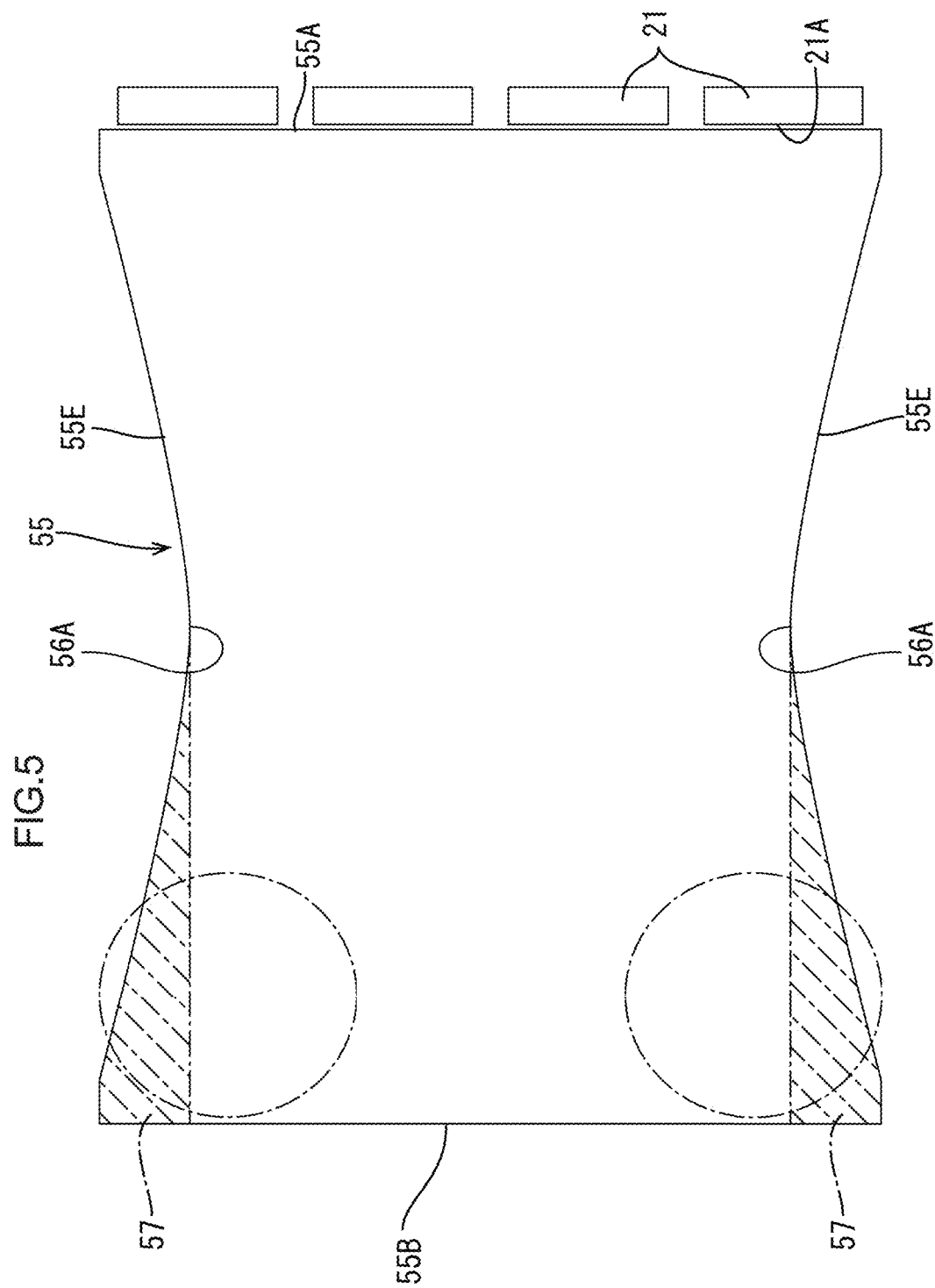
FIG. 5 is a plan view of the main components of a backlight device of Embodiment 2.

Next, Embodiment 2 will be described with reference to FIGS. 5 and 6. A backlight device and a liquid crystal display device of the present embodiment differ from those of Embodiment 1 in terms of the position and shape of a notch provided in a light-guiding plate. In the following, components that are different from those of Embodiment 1 will be described, and the same components are given signs obtained by adding 30 to the signs of Embodiment 1 and are not described. Further, FIG. 5 shows the front side left.

A light-guiding plate 55 that is used in the present embodiment differs in that the light-guiding plate through-hole 26 of Embodiment 1 is replaced by a recessed part 56 (which is an example of a notch or a recess) in which long side edges constituting a pair of side surfaces 55E of the light-guiding plate 55 are notched in flat U shapes across substantially the whole long side edges.

With such a configuration, a portion of light having entered the light-guiding plate 55 through a light entrance surface 55A with directivity has its path blocked by a member placed in the recessed part 56 or by the recessed part 56 per se. For this reason, a region between the recessed part 56 and an entrance opposite surface 55B is a shielded region 57 that is hard for light to reach (see FIG. 5). This shielded region 57 causes unevenness in luminance of a backlight device 50.

To address this problem, the backlight device 50 of the present embodiment is provided with a reflecting sheet 65 (which is an example of a condensing member) that reflects light having propagated through inside the light-guiding plate 55 and leaked out through an exit opposite surface 55D and condenses the light toward the shielded region 57.

The reflecting sheet 65 of the present embodiment is placed opposite a region of the exit opposite surface 55D of the light-guiding plate 55 that is closer to the entrance opposite surface 55B in the optical axial direction of light (Y-axis direction, length direction of the light-guiding plate 55) than apices 56A of the recessed part 56 notched innermost from the side surfaces 55E, and extends across the whole region in a width direction (X-axis direction). In other words, the reflecting sheet 65 has a reflecting surface 65A that, in a case where the light-guiding plate 55 is seen in a plan view, is disposed to overlap a region of the light-guiding plate 55 that is located closer to the entrance opposite surface 55B than the recessed part 56.

Figure 6:
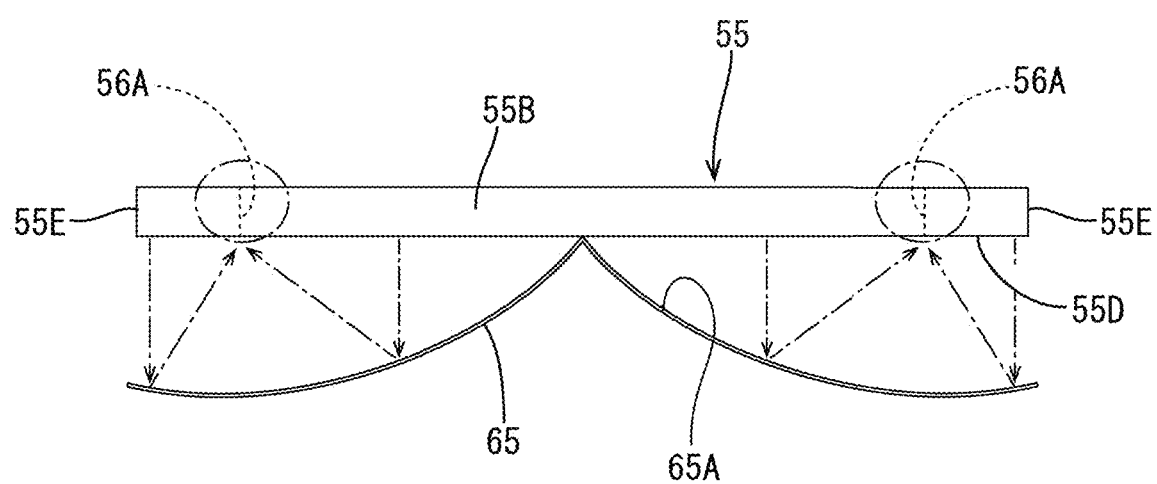
FIG. 6 is a front view of the main components of the backlight device.

As shown in FIG. 6, the reflecting sheet 65 of the present embodiment is disposed to be in the shape of a pair of curved surfaces hanging down in a direction away from the exit opposite surface 55D from the midsection between the pair of side surfaces 55E of the light-guiding plate 55 toward a pair of the shielded regions 57. As a result, the reflecting surface 65A of the reflecting sheet 65 is disposed to surround the shielded regions 57 from a position away from the shielded regions 57 in a width direction.

The shape in which the reflecting sheet 65 is disposed to be is optically set so that light reflected by the reflecting surface 65A is condensed toward the shielded regions 57. That is, with such a configuration, that portion of light emitted by the LEDs 21, having entered the light-guiding plate 55, and having propagated through inside the light-guiding plate 55 which have leaked out through the exit opposite surface 55D located closer to the entrance opposite surface 55B than the apices 56A of the recessed part 56 is reflected by the reflecting surface 65A of the reflecting sheet 65, condensed toward the shielded regions 57, and allowed reentry through the exit opposite surface 55D of the light-guiding plate 55. Accordingly, this light thus allowed reentry illuminates the shielded regions 57, so that uniformity in the whole luminance of the light-guiding plate 55 is achieved.

Other Embodiments

The technology disclosed herein is not limited to the embodiments described above with reference to the drawings. For example, the following embodiments may be included in the technical scope.

(1) Although the embodiments described above have illustrated the reflecting sheets 35 and 65 as condensing members, a condensing member is not limited to a sheet-shaped condensing member. For example, a condensing member may be configured such that the bottom part of the chassis is formed in the shape of a curved surface that is capable of condensing light or a block-shaped condensing member that is not in the shape of a sheet may be separately provided. In other words, a condensing member needs only be formed to have a reflecting surface that so reflects light having leaked out through the exit opposite surface as to condense the light toward a shielded region.

(2) The angle and shape of a condensing member is optically designed as appropriate, as angular distributions of light intensities vary depending on the shape of a notch in a light-guiding plate and the position in which the notch is provided. Further, in a case where a notch (through-hole) is provided in the midsection between a pair of side surfaces of a light-guiding plate as in the case of Embodiment 1, a cross-section of the condensing member in a width direction (X-axis direction) may be the shape of letter U or V as well as a paraboloid, and such a configuration is advantageous in terms of a reduction in manufacturing cost by construction simplification.

(3) As a member that constitutes a reflecting surface, a sheet-shaped member, such as an ESR, that is used as a reflecting sheet for a common backlight device may be processed and placed or an aluminum-deposited mirror or the like may be used.

(4) Although each of the embodiments described above has illustrated a planar liquid crystal display device having a through-hole or a recessed part, the technology disclosed herein is also applicable to a display device that is in the shape of a curved surface and a display device that is in an irregular shape other than those shapes mentioned above.

(5) Embodiment 1 described above has illustrated the liquid crystal display device 10, which has one through-hole. However, in the case of two or more through-holes, too, the technology disclosed herein may be applied by providing two or more focal points by disposing a reflecting surface to be in the shape of letter W.

(6) Although each of the embodiments described above has shown a configuration in which the reflecting surface of the condensing member is placed opposite only the region of the light-guiding plate that is closer to the entrance opposite surface than the notch, the reflecting surface may also be placed opposite a side closer to the light entrance surface than the notch.

(7) Further, although each of the embodiments described above has assumed a configuration in which a light-absorbing member is provided in a region of the exit opposite surface that the reflecting surface does not face, the light-absorbing member does not necessarily need to be provided.

The invention claimed is:
1. A lighting device comprising:
a light-guiding plate constituted of a plate-shaped member; and
a light source that is disposed opposite an end face of the light-guiding plate and emits light toward the end face, wherein
the light-guiding plate includes a light entrance surface through which light from the light source enters, an entrance opposite surface located opposite to the light entrance surface, a light exit surface that is one of a pair of plate surfaces and through which the light exits, and an exit opposite surface located opposite to the light exit surface, and the light-guiding plate has a notch formed by notching a part thereof,
a region between the notch and the entrance opposite surface is a shielded region where the notch blocks light guided through inside the light-guiding plate from the light entrance surface toward the entrance opposite surface,
a condensing member having a reflecting surface that reflects, in a condensing manner toward the shielded region, light having leaked out through the exit opposite surface is provided opposite the exit opposite surface of the light-guiding plate, and
the notch is a through-hole bored through the light-guiding plate.
2. The lighting device according to claim 1, wherein the condensing member is disposed so that in a case where the light-guiding plate is seen in a plan view, the reflecting surface is disposed to overlap a region of the light-guiding plate that is located closer to the entrance opposite surface than the notch.

3. The lighting device according to claim 1, wherein the reflecting surface is in a shape of a curved surface depressed in a direction away from the light-guiding plate so as to surround the shielded region.

4. The lighting device according to claim 1, wherein a light-absorbing member that absorbs light having leaked out through the exit opposite surface is provided in a region of the exit opposite surface that the reflecting surface does not face.

5. The lighting device according to claim 1, wherein the notch is a recess depressed in a concave manner from an edge of the light-guiding plate.

6. A display device comprising:
   the lighting device according to claim 1; and
   a display panel that performs a display through use of light from the lighting device.

7. The display device according to claim 6, wherein the display panel has a panel notch notched along the notch and provided in a position that corresponds to the notch.

* * * * *